(12) United States Patent
Kim et al.

(10) Patent No.: US 10,886,760 B2
(45) Date of Patent: Jan. 5, 2021

(54) WIRELESS CHARGING DEVICE

(71) Applicant: Samsung Electronics Co., Ltd., Suwon-si (KR)

(72) Inventors: Jin Wook Kim, Gimcheon-si (KR); Jae Hyung Kim, Gwangju-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 443 days.

(21) Appl. No.: 15/746,243

(22) PCT Filed: Sep. 11, 2017

(86) PCT No.: PCT/KR2017/009956
§ 371 (c)(1),
(2) Date: Jan. 19, 2018

(87) PCT Pub. No.: WO2018/117372
PCT Pub. Date: Jun. 28, 2018

(65) Prior Publication Data
US 2020/0083726 A1    Mar. 12, 2020

(30) Foreign Application Priority Data
Dec. 23, 2016    (KR) .................. 10-2016-0178386

(51) Int. Cl.
*H02J 7/00*    (2006.01)
*H02J 50/10*    (2016.01)
(Continued)

(52) U.S. Cl.
CPC .......... *H02J 7/0044* (2013.01); *H02J 7/0042* (2013.01); *H02J 7/007192* (2020.01);
(Continued)

(58) Field of Classification Search
CPC .......... H02J 7/0044; H02J 50/00; H02J 50/10; H02J 7/007192; H02J 7/025; H02J 7/0042; F01P 5/02; B60R 11/0241
(Continued)

(56) References Cited

U.S. PATENT DOCUMENTS 7,830,116 B2    11/2010    Toya et al.
9,190,865 B2    11/2015    Winget et al.
(Continued)

FOREIGN PATENT DOCUMENTS

KR    10-2013-0077372 A    7/2013
KR    10-2015-0007708 A    1/2015
(Continued)

OTHER PUBLICATIONS

European Office Action dated Dec. 17, 2018; Reference #: P6073540PCT/EP; Application #:/Patent #: 17838117.4-1202 / 3361597 PCT/KR2017009956.

*Primary Examiner* — Zixuan Zhou
(74) *Attorney, Agent, or Firm* — Jefferson IP Law, LLP

(57) ABSTRACT

Disclosed is a wireless charging device including a first cover, at least a portion of a surface of which has a frictional force of a specific magnitude, a second cover disposed under the first cover and having an elastic force of a specific magnitude, an upper housing disposed under the second cover, a lower housing coupled to the upper housing, at least one charging coil disposed between the upper housing and the lower housing and configured to supply electric power to an electronic device positioned on an upper surface of the first cover, a power source part connected to the at least one charging coil, and a holding state changing part configured to help change holding states of the upper housing and the lower housing.

14 Claims, 16 Drawing Sheets

(51) Int. Cl.
*H02J 7/02* (2016.01)
*H02J 50/00* (2016.01)
*F01P 5/02* (2006.01)

(52) U.S. Cl.
CPC .............. *H02J 7/025* (2013.01); *H02J 50/00* (2016.02); *H02J 50/10* (2016.02); *F01P 5/02* (2013.01)

(58) Field of Classification Search
USPC ........................................ 320/108, 113–115
See application file for complete search history.

(56) References Cited

U.S. PATENT DOCUMENTS

| | | | |
|---|---|---|---|
| 2009/0267559 A1 | 10/2009 | Toya et al. | |
| 2012/0091952 A1 | 4/2012 | Oshimi et al. | |
| 2013/0260610 A1 | 10/2013 | Winget et al. | |
| 2015/0138699 A1* | 5/2015 | Yamazaki | H02J 7/025 361/679.03 |
| 2015/0162767 A1* | 6/2015 | Oh | G06F 1/1632 320/108 |
| 2016/0064987 A1 | 3/2016 | Sheu et al. | |
| 2016/0099596 A1 | 4/2016 | Chien | |
| 2016/0250099 A1 | 9/2016 | Eim et al. | |
| 2016/0254693 A1 | 9/2016 | Moon | |
| 2016/0359356 A1 | 12/2016 | Song | |
| 2017/0093198 A1* | 3/2017 | Graham | H02J 7/0042 |
| 2018/0025838 A1* | 1/2018 | Som | H02J 50/10 361/143 |

FOREIGN PATENT DOCUMENTS

| | | |
|---|---|---|
| KR | 10-2016-0105014 A | 9/2016 |
| KR | 10-2016-0144043 A | 12/2016 |
| KR | 10-2016-0146478 A | 12/2016 |
| WO | 2015/152461 A1 | 10/2015 |

\* cited by examiner

WIRELESS CHARGING DEVICE

TECHNICAL FIELD

The present disclosure relates to a wireless charging device.

BACKGROUND ART

Portable electronic devices may employ batteries. Accordingly, various schemes for charging batteries of the portable electronic devices have been suggested. For example, conventionally, the portable electronic devices have charged the batteries by using cables. In recent years, wireless charging devices capable of wirelessly charging the batteries of the portable electronic devices have been suggested.

DISCLOSURE

Technical Problem

Conventionally, the wireless charging devices support the weight of the portable electronic devices simply positioned on the wireless charging devices. Accordingly, if the user throw the portable electronic device to position the portable electronic device on the wireless charging device, the portable electronic device may easily deviate from the center of the wireless charging device or be separated from the upper surface of the wireless charging device without being positioned at the center of the upper surface of the wireless charging devices, resulting in failure of a proper charging state. Further, even though the portable electronic device is properly arranged on the wireless charging device, the alignment state of the charging coils of the wireless charging device and the portable electronic device may be released so that the charging efficiency may decrease abruptly when the portable electronic device is shaken due to a specific event (e.g., vibration).

Technical Solution

In accordance with an aspect of the present disclosure, there is provided a wireless charging device including a first cover, at least a portion of a surface of which has a frictional force of a specific magnitude, a second cover disposed under the first cover and having an elastic force of a specific magnitude, an upper housing disposed under the second cover, a lower housing coupled to the upper housing, at least one charging coil disposed between the upper housing and the lower housing and configured to supply electric power to an electronic device positioned on an upper surface of the first cover, a power source part connected to the at least one charging coil, and a holding state changing part configured to help change holding states of the upper housing and the lower housing.

As described above, according to various embodiments, the portable electronic device may be laid on the wireless charging device safely and firmly, an arrangement state of the portable electronic device, which is being charged, and the wireless charging device may be maintained stably, and the portable electronic device may be prevented from being separated from the upper surface of the wireless charging device.

Advantageous Effects

Various embodiments of the present disclosure provide a wireless charging device that may firmly maintain an arrangement state of a portable electronic device and the wireless charging device and prevent the portable electronic device from being easily separated from the wireless charging device even though vibration is generated while the portable electronic device is charged, by forming an upper surface of the wireless charging device on which the portable electronic device is positioned of a material of a relatively high frictional force.

Various embodiments of the present disclosure provide a wireless charging device that may restrain damage to or scratches of a portable electronic device and the wireless charging device even when the portable electronic device is thrown onto the wireless charging device by forming an upper first layer of the wireless charging device of a material of a relatively high frictional force and a second layer under the first layer of a material of a relatively high elasticity, and may firmly maintain an arrangement state of the portable electronic device and the wireless charging device by absorbing vibration generated by the portable electronic device.

DESCRIPTION OF DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

MODE FOR INVENTION

Figure 1A:
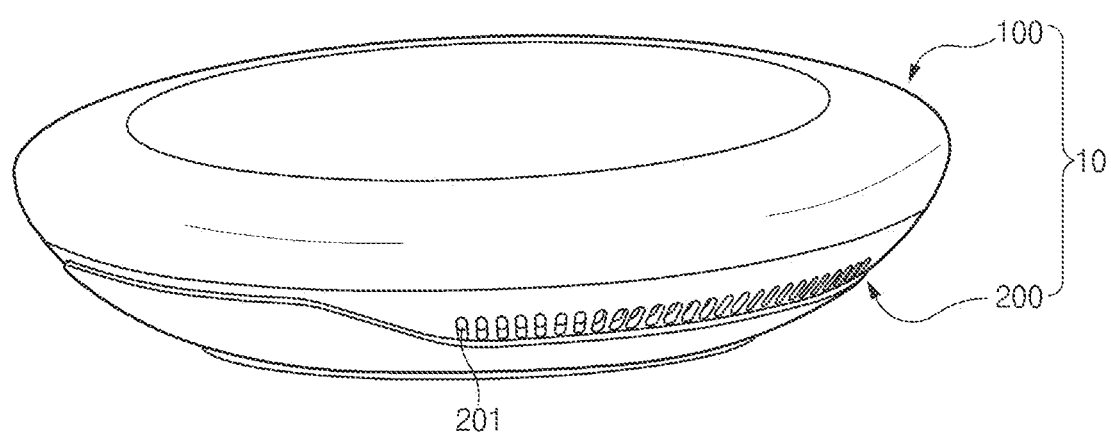
FIG. 1A is a view illustrating an example of an external appearance of a wireless charging device, when viewed from a first direction, according to an embodiment of the present disclosure.

Hereinafter, various embodiments of the present invention may be described with reference to accompanying drawings. Accordingly, those of ordinary skill in the art will recognize that modification, equivalent, and/or alternative on the various embodiments described herein can be variously made without departing from the scope and spirit of the present invention. With regard to description of drawings, similar elements may be marked by similar reference numerals.

In this disclosure, the expressions "have", "may have", "include" and "comprise", or "may include" and "may comprise" used herein indicate existence of corresponding features (e.g., elements such as numeric values, functions, operations, or components) but do not exclude presence of additional features.

In this disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in various embodiments may be used to refer to various elements regardless of the order, but do not limit the corresponding elements. The terms may be used to distinguish the relevant elements from other elements. For example, "a first user device" and "a second user device" indicate different user devices regardless of the order or priority. For example, without departing the scope of the present invention, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used in this disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in this disclosure are used to describe specified embodiments and are not intended to limit the scope of another embodiment. The terms of a singular form may include plural forms unless otherwise specified. All the terms used herein, which include technical or scientific terms, may have the same meaning that is generally understood by a person skilled in the art. It will be further understood that terms, which are defined in a dictionary commonly used, should also be interpreted as is customary in the relevant related art and not in an idealized or overly formal unless expressly so defined in various embodiments of this disclosure. In some cases, even if terms are terms which are defined in this disclosure, they may not be interpreted to exclude embodiments of this invention.

An electronic device according to various embodiments of this invention may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, camera modules, or wearable electronic devices (e.g., smart glasses, head-mounted-devices (HMDs), electronic apparels, electronic bracelets, electronic necklaces, electronic appcessories, electronic tattoos, smart mirrors, or smart watches).

According to various embodiments, the electronic device may be a smart home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of this invention may not be limited to the above-described electronic devices and may include other electronic devices and new electronic devices according to the development of technologies.

Hereinafter, electronic devices according to various embodiments will be described with reference to the accompanying drawings. In this disclosure, the term "user" may refer to a person who uses an electronic device or may refer to a device (e.g., an artificial intelligence electronic device) that uses the electronic device.

Figure 1B:
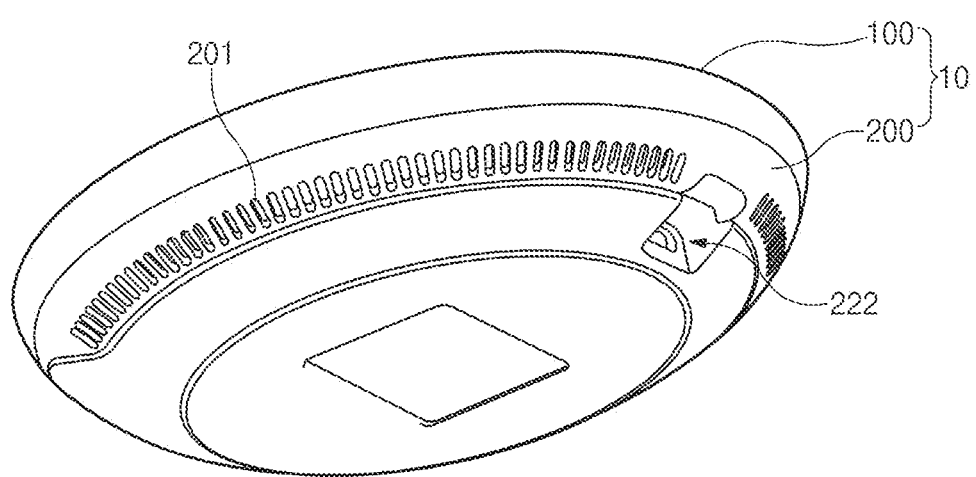
FIG. 1B is a view illustrating an example of an external appearance of a wireless charging device, when viewed from a second direction, according to an embodiment of the present disclosure.

FIG. 1A is a view illustrating an example of an external appearance of a wireless charging device, when viewed from a first direction, according to an embodiment of the present disclosure. FIG. 1B is a view illustrating an example of an external appearance of a wireless charging device, when viewed from a second direction, according to an embodiment of the present disclosure.

Referring to FIGS. 1A and 1B, the wireless charging device 10 according to an embodiment of the present disclosure may include a case part 200 and a cover part 100.

Elements (e.g., a charging coil, a cooling fan, and a power source part) related to wireless charging may be disposed inside the case part 200. A bottom surface of the case part 200, for example, may have a circular or elliptical shape. Further, the bottom surface of the case part 200 may have a polygonal shape. At least a portion of a vertical section on at least one side surface of the case part 200 may be curved. According to an embodiment, the case part 200 may have a bowl shape such that a horizontal section of the case part 200 gradually increases as it goes from the bottom to an upper side of the case part 200.

The cover part 100 may be disposed on an upper side of the case part 200. According to an embodiment, an upper periphery of the case part 200 and a lower periphery of the cover part 100 may be engaged with each other to be fixed. At least one air circulation hole 201 that may emit heat generated during charging of the portable electronic device may be disposed on one side of the case part 200.

A plurality of air circulation holes 201 may be disposed along a circumference of the case part 200 at a specific interval in a band shape. A power source part 222, to which an external cable (e.g., a USB cable) is connected, may be disposed on one side of the case part 200. The power source part 222 may be spaced apart from the bottom surface of the case part 200 by a specific height and a side wall of the case part 200 may be recessed to form the power source part 222. A connector (e.g., a USB connector), into which a plug of an external cable may be inserted, may be disposed in the recessed area. The case part 200 may be formed of a material having a specific strength or higher, for example, plastic, metal, or wood.

The cover part 100 may be disposed on the upper side of the case part 200 to have a specific thickness and a specific area. According to an embodiment, the area of a section of a lower end periphery of the cover part 100 may have the same area as an upper section of the case part 200. Accordingly, if the cover part 100 is positioned on the case part 200, a side surface of the case part 200 may be disposed on the side surface of the cover part 100 to be connected to the side surface of the cover part 100. For example, border areas of a lower periphery of the cover part 100 and an upper periphery of the case part 200 may be smoothly connected to each other without any step.

The cover part 100 may be formed of a material that may absorb an impact that may be generated while the portable electronic device is positioned on the cover part 100. Further, the cover part 100 may be formed of a material that may absorb vibration generated by the portable electronic device to restrain movement of the portable electronic device positioned on the cover part 100. According to an embodiment, the cover part 100 may be formed of rubber, sponge, or expanded polystyrene. According to an embodiment, at least a portion of the cover part 100 may be formed of cotton flannel or leather.

As described above, the wireless charging device 10 according to the present disclosure may prevent damage to a charging coil disposed inside the wireless charging device 10 and prevent deviation of the portable electronic device from a charging zone by eliminating, reducing, or offsetting an impact and vibration applied to the portable electronic device through the structure of the cover part 100. Further, because a spacing distance between the portable electronic device and the charging coil disposed under the cover part 100 is reduced as the soft cover part 100 is pressed when the portable electronic device is positioned on the wireless charging device 10, the wireless charging device 10 may prevent charging efficiency from decreasing due to the shape (an edge/a rear surface having a curved surface) of the portable electronic device.

Figure 2:
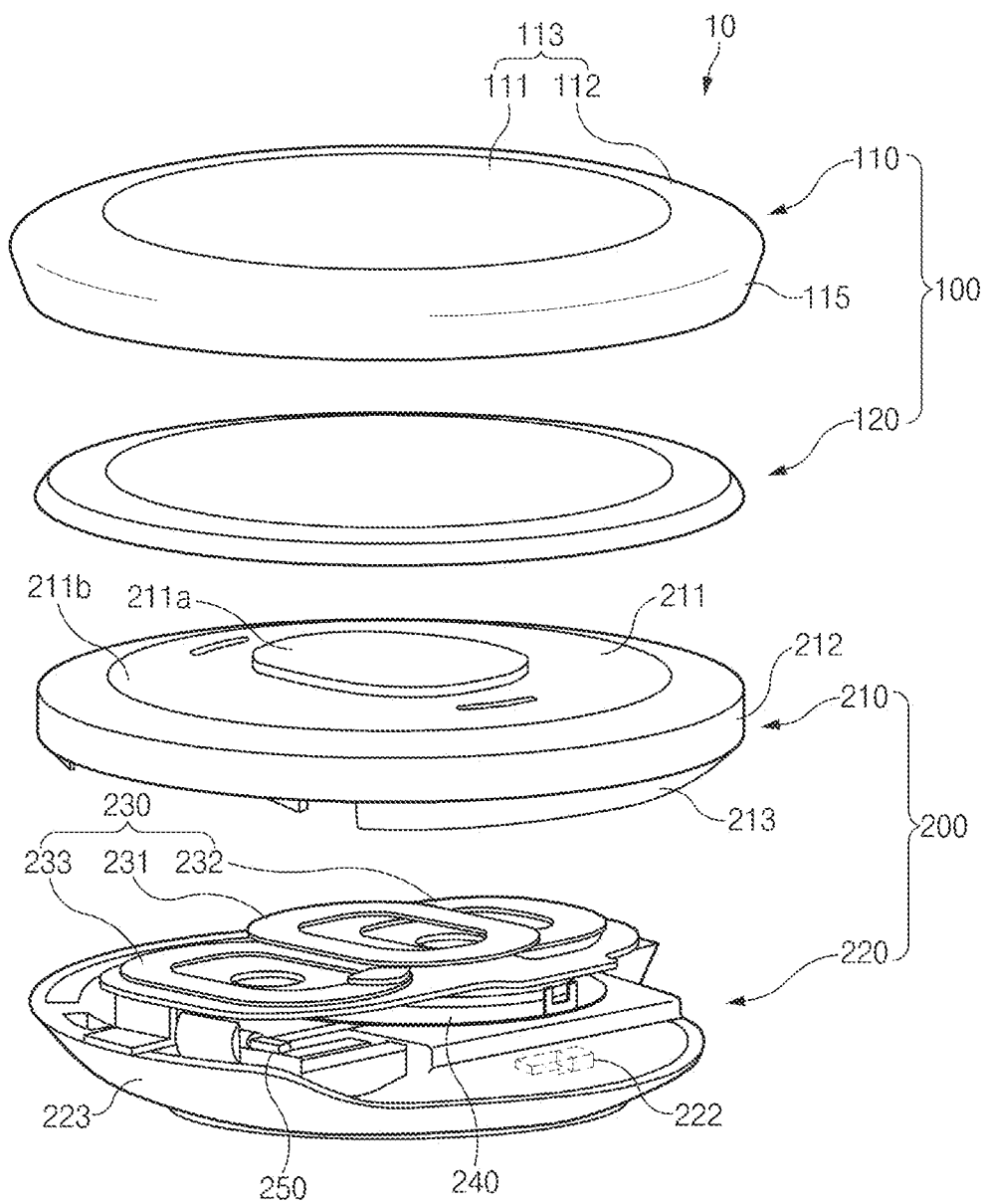
FIG. 2 is a view illustrating an example of an exploded perspective view of a wireless charging device according to an embodiment of the present disclosure.
Figure 3:
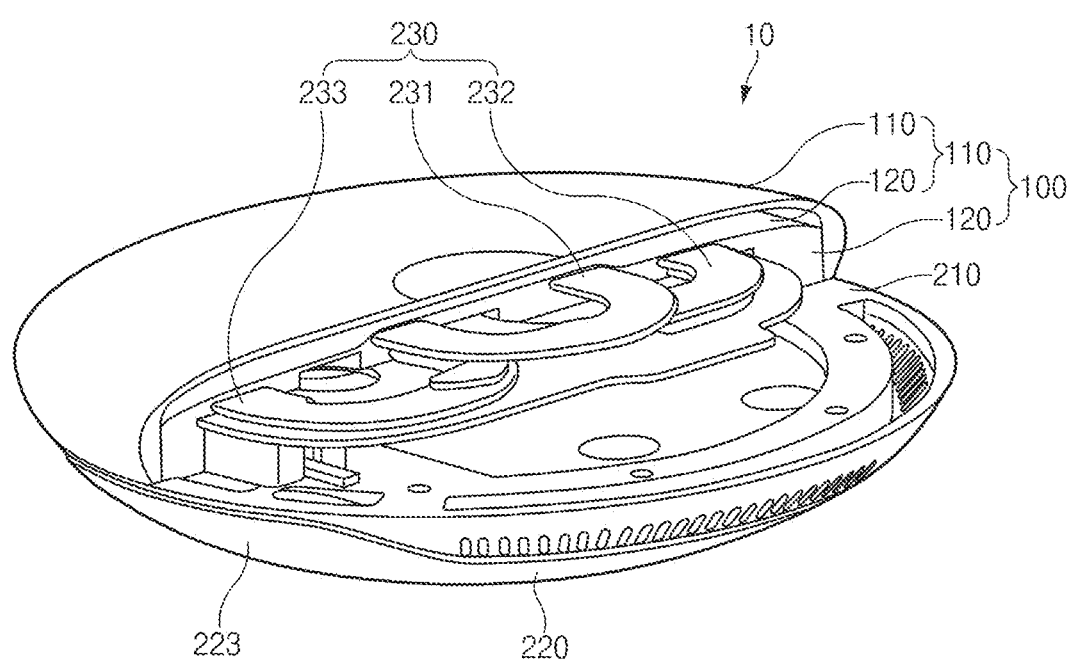
FIG. 3 is an example of a cutaway view obtained by cutting away a portion of a wireless charging device according to an embodiment of the present disclosure.
Figure 4:
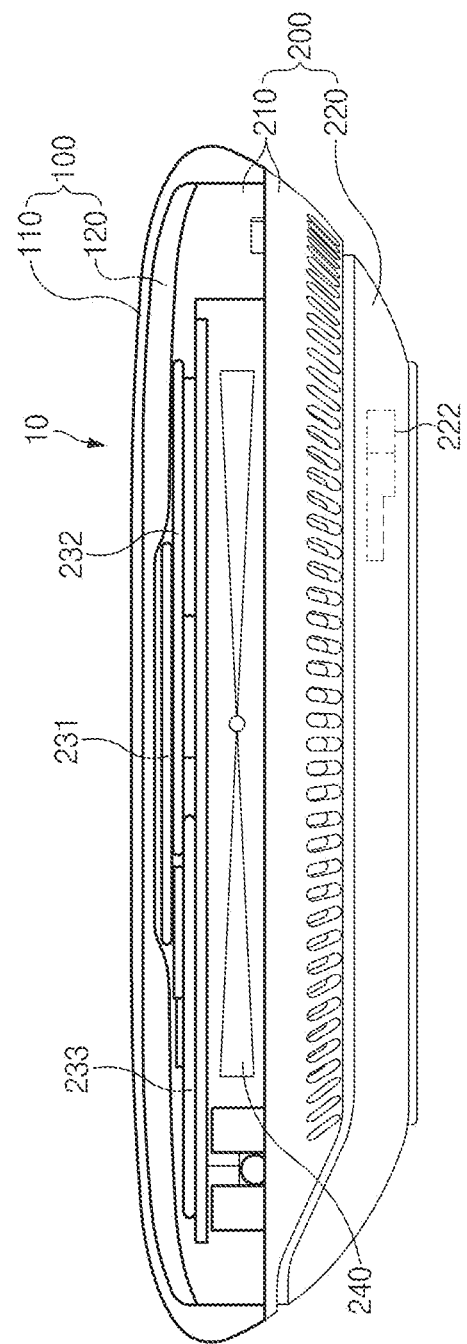
FIG. 4 is an example of a sectional view of a wireless charging device according to an embodiment of the present disclosure.

FIG. 2 is a view illustrating an example of an exploded perspective view of a wireless charging device according to an embodiment of the present disclosure. FIG. 3 is an example of a cutaway view obtained by cutting away a portion of a wireless charging device according to an embodiment of the present disclosure. FIG. 4 is an example of a sectional view of a wireless charging device according to an embodiment of the present disclosure.

Referring to FIGS. 2 to 4, the wireless charging device 10 according to an embodiment of the present disclosure may include a first cover 110, a second cover 120, an upper housing 210, and a lower housing 220, and at least one charging coil 230, a cooling fan 240, a power source part 222, and a holding state changing part 250 may be provided inside the lower housing 220.

At least a portion of the first cover 110 may have a disk shape or a polygonal shape as a whole or in part. The first cover 110, for example, may include an upper area 113 on which the portable electronic device is positioned, and a side wall area 115 having a band shape while having a specific width from a periphery of the upper area 113 to a lower side. At least a portion of a lower side of the first cover 110 may have an opened area.

According to various embodiments, the upper area 113 of the first cover 110 may include a central area 111 and a peripheral area 112. The central area 111 and the peripheral area 112 may have the same thickness. According to various embodiments, the central area 111 and the peripheral area 112 may be formed of the same material. Alternatively, the central area 111 may be formed of a material that is harder than that of the peripheral area 112. Alternatively, the central area 111 may be formed of a material, a surface frictional force of which is lower than that of the peripheral area 112. According to an embodiment, at least one area of the central area 111 and the peripheral area 112 may be formed of at least one of rubber, synthetic rubber, leather, or cotton flannel. Alternatively, the central area 111 may be formed of leather, and the peripheral area 112 may be formed of rubber.

According to various embodiments, the thickness of the central area 111 of the upper area 113 of the first cover 110 may be smaller than the thickness of the peripheral area 112. For example, when the central area 111 has a thickness of not less than 0.5 mm and less than 1 mm, the thickness of the peripheral area 112 may be not less than 1 mm and less than 3 mm. Further, the central area 111 may have a thickness corresponding to 20% to 80% of the thickness of the peripheral area 112. Further, the thickness of the central area 111 may become gradually smaller as it goes from a periphery to a central portion of the central area 111. The thickness of the peripheral area 112 may be the same as a whole or may become gradually larger as it goes from the center to the outside of the peripheral area 112. Further, the central portion of the peripheral area 112 may be thicker than the periphery of the peripheral area 112.

According to various embodiments, the thickness of the central area 111 with respect to the bottom surface of the wireless charging device 10 is smaller than the peripheral area 112, the height of the surface of the central area 111 may be larger than the height of the surface of the peripheral area 112. Further, the height of the central area 111 with respect to the bottom surface of the wireless charging device 10 may be smaller than the height of the peripheral area 112.

The thickness of the central portion of the side wall area 115 may be larger than the thickness of the peripheral portion. The side wall area 115 may be formed of the same material (e.g., rubber) as the upper area 113. Further, when at least a portion of the side wall area 115 is formed of a material (e.g., when the upper area 113 is formed of rubber, the side wall area 115 is formed of leather or cotton flannel) that is different from that of the upper area 113. The first cover 110 may primarily absorb an impact generated while the portable electronic device is positioned on the first cover 110. Further, the first cover 110 may function to support the portable electronic device positioned on the first cover 110 such that the portable electronic device is not slid.

The second cover 120 may be seated inside the first cover 110. A bonding layer may be disposed between the second cover 120 and the first cover 110. Further, an air layer may be disposed between the second cover 120 and the first cover 110. At least a portion of the second cover 120 may have a disk shape or a polygonal shape as a whole or in part.

The thickness of the central portion of the second cover 120 may be smaller than the thickness of the peripheral portion. For example, the thickness of the second cover 120 may become gradually smaller as it goes from the periphery to the central portion of the second cover 120. Further, a specific area of the central portion of the second cover 120 may be thinner than a neighboring area thereof, and the peripheral portion of the second cover 120 may be formed of the same material. According to an embodiment, the central portion of the second cover 120 may have a thickness corresponding to 20% to 90% of the thickness of the neighboring area thereof. The second cover 120 may be formed of a material having an elastic force of a specific magnitude. For example, at least a portion of the second cover 120 may be formed of expanded polystyrene, sponge, cotton, latex, rubber, and a resin (e.g., polyurethane). The second cover 120 may absorb an impact generated while the portable electronic device is positioned on the second cover 120.

The upper housing 210 may have a cap or lid shape that covers the lower housing 220 as a whole. For example, the upper housing 210 may include an upper surface 211 having a disk shape or a polygonal shape, a side surface 212 extending vertically downwards from a side surface of the upper surface 211 by a specific width, and a seating surface 213 extending inwards from a lower periphery of the side surface 212 while having a specific inclination. The seating surface 213, for example, may be inserted into the lower housing 220 when the upper housing 210 and the lower housing 220 are coupled to each other. The seating surface 213 may be formed in at least a partial area of the lower periphery of the side surface 212. The upper housing 210 may be disposed under the second cover 120 and may be coupled to the second cover 120.

A central portion 211a of the upper surface 211 of the upper housing 210 may protrude further than a peripheral area 211b thereof (e.g., in a form in which the central portion has a protrusion protruding in a form of a coil). For example, the central portion 211a may protrude upwards while being stepped from the peripheral area 211b by a specific height. A first charging coil 231 disposed on the uppermost layer of the charging coil 230 may be disposed under the central portion 211a. The upper housing 210, for example, may be formed of a nonmetallic material such as plastic. Further, the upper surface 211 of the upper housing 210 may be formed of a nonmetallic material, and the side surface 212 and the seating surface 213 of the upper housing 210 may be formed of a metallic or nonmetallic material. According to various embodiments, a bonding layer that fixes the second cover 120 to the upper housing 210 may be further disposed between the second cover 120 and the upper housing 210. The bonding layer may be formed in a gel form having a specific elasticity or a tape form.

The lower housing 220 may be disposed under the upper housing 210, and the charging coil 230, the cooling fan 240, the power source part 222, and the holding state changing part 250 may be seated on the lower housing 220. For example, the lower housing 220 may have a dish shape or a poly-pyramid shape, at least a portion of the bottom of which is flat and a horizontal section of which gradually increases as it goes from a periphery of the flat surface to the upper side. According to an embodiment, the lower housing 220 may include an extension part 223, of which at least a partial area of the area, in which the holding state changing part 250 is disposed, protrudes upwards further than the other areas. The seating surface 213 may not be formed in an area of the upper housing 210 corresponding to the area in which the extension part 223 is disposed. A structure corresponding to the holding state changing part 250, a structure corresponding to the power source part 222, and the like may be disposed inside the lower housing 220. The cooling fan 240 may be disposed on the structures, and the charging coil 230 may be disposed on the cooling fan 240.

At least one charging coil 230 may be disposed between the upper housing 210 and the lower housing 220. For example, the charging coil 230 may include a first charging coil 231 disposed at the center of the lower housing 220, a second charging coil 232 disposed under the first charging coil 231 and disposed such that the central point of the second coil 232 is spaced from the central point of the first charging coil 231 in a first direction by a specific interval, and a third charging coil 233 disposed under the second charging coil 232 and disposed such that the central point of the third charging coil 233 is spaced apart from the central point of the first charging coil 232 in a second direction by a specific interval. The central points of the first charging coil 231, the second charging coil 232, and the third charging coil 233 may be arranged on a first directional axis. For example, the second charging coil 232 and the third charging coil 233 may be disposed on the left and right sides of the first charging coil 231. According to various embodiments, the charging coil 230 may include two charging coils that are disposed not to overlap each other. Alternatively, the charging coil 230 may include only the first charging coil 231 and the third charging coil 233.

The first charging coil 231 may supply electric power to the portable electronic device while the central portion of the portable electronic device is arranged at the center of the first cover 110. For example, when the holding state of the wireless charging device 10 is in a stand state (e.g., a state in which the upper housing 210 stands while having a specific upward inclination with respect to the lower housing 220), the second charging coil 232 may be used to charge the portable charging device while the portable electronic device is disposed longitudinally in the wireless charging device 10. The third charging coil 233 may supply electric power to the portable charging device while the portable electronic device is disposed transversely in a state in which the wireless charging device 10 stands.

According to various embodiments, at least one of the charging coils 230 may be used to charge the portable electronic device. For example, in the stand state, the wireless charging device 10 may charge the portable electronic device by using the first charging coil 231 and the second charging coil 232 according to a disposition state (e.g., a longitudinally held state) of the portable electronic device. Alternatively, in a horizontally disposed state (e.g., a state in which the upper housing 210 and the lower housing 220 are disposed in parallel), the wireless charging device 10 may supply electric power related to charging of the portable electronic device by using only the first charging coil 231, by using the first charging coil 231 and the second charging coil 232, or by using the first charging coil 231 and the third charging coil 233 according to a disposition state (e.g., a state in which the portable electronic device is laid in one direction) of the portable electronic device positioned on the upper housing 210. The charging coil 230 may be connected to the power source part 222, and a charging form (which charging coil is to be used) may be determined under the control of the power source part 222.

The cooling fan 240 may be disposed under the charging coil 230, and may be operated for at least a part of a time period in which a charging operation is performed to cool the charging coil 230. If the cooling fan 240 is rotated, heat may be discharged to the outside through the air circulation hole 201 and exterior air may be introduced into the lower housing 220 to cool the charging coil 230. In this regard, the cooling fan 240 may circulate air in the upper layer, in which the charging coil 230 is disposed, through a lower air circulation hole 201. The cooling fan 240 may be connected to the power source part 222, and may be operated in correspondence to the control of the power source part 222.

The power source part 222 may receive electric power through a cable connected through a connector, and may deliver the received electric power to the charging coil 230. In this regard, the power source part 222 may detect a charging coil of the plurality of charging coils 230, which is aligned with the portable electronic device, and may supply electric power to the detected charging coil. For example, after sequentially supplying electric power of a specific magnitude to the plurality of charging coils 230, the power source part 222 may determine which charging coil is to be used with reference to a feedback from the portable electronic device. In this regard, the power source part 222 may include a charging control circuit related to control of the charging coil 230.

If supplying electric power to at least one charging coil, the power source part 222 may operate the cooling fan 240. According to an embodiment, if a specific time elapses after the charging operation is started, the power source part 222 may operate the cooling fan 240. Alternatively, the wireless charging device 10 may include a temperature sensor disposed in a neighboring area of the charging coil 230. The power source part 222 may be electrically connected to the temperature sensor, and may activate the cooling fan 240 if the interior temperature of the wireless charging device 10 is changed to a specific temperature or higher, based on information delivered from the temperature sensor. If the interior temperature of the wireless charging device 10 is lowered to a specific temperature or lower, the power source part 222 may deactivate the cooling fan 240. In this regard, the power source part 222 may include a temperature control circuit (e.g., a circuit that collects and analyzes information of the temperature sensor and controls activation and deactivation of the cooling fan 240) related to control of temperature.

The holding state changing part 250 may change a holding state of the upper housing 210, in which the cover part 100 is disposed, and the lower housing 220 in correspondence to an external pressure. For example, the holding state changing part 250 may have any one of a stand state in which the upper housing 210 stands while having a specific upward inclination with respect to the lower housing 220, and a horizontally disposed state in which the upper housing 210 and the lower housing 220 are disposed in parallel. According to various embodiments, the stand state may include a state of various angles in correspondence to an external pressure. For example, the upper housing 210 may be laid in various angle states, in which the upper housing 210 is inclined upwards at 10 to less than 90 degrees (e.g., 30 degrees, 40 degrees, 45 degrees, and 50 degrees) with respect to the lower housing 220 positioned on a flat bottom. In this regard, the holding state changing part may include a hinge structure.

As described above, the wireless charging device 10 according to an embodiment of the present disclosure supports the portable electronic device in a form in which the portable electronic device may be conveniently carried when being folded and may be held in transverse and longitudinal forms when being unfolded, based on an integral foldable stand structure. Further, the wireless charging device 10 according to the present disclosure may prevent damage to the charging coil 230 or damage to the device by absorbing an impact of the portable electronic device even when the portable electronic device is thrown toward the wireless charging device 10 when the portable electronic device is held for charging, based on the first cover 110 and the second cover 120. Further, the wireless charging device 10 according to the present disclosure may perform wireless charging by absorbing vibration of the portable electronic device and firmly maintaining an arrangement state of the portable electronic device and the wireless charging device 10 even when vibration is generated while the portable electronic device is charged, based on the cover part 100. Further, even when an external impact is applied, the impact may be offset by the cover part 100, the thickness of which becomes larger as it goes from the center to the outside of the wireless charging device 10.

According to an embodiment, the wireless charging device 10 support the portable electronic device such that the portable electronic device may be in a stable disposition state for charging as the cover part 100 is pressed only by a specific depth.

Figure 5:
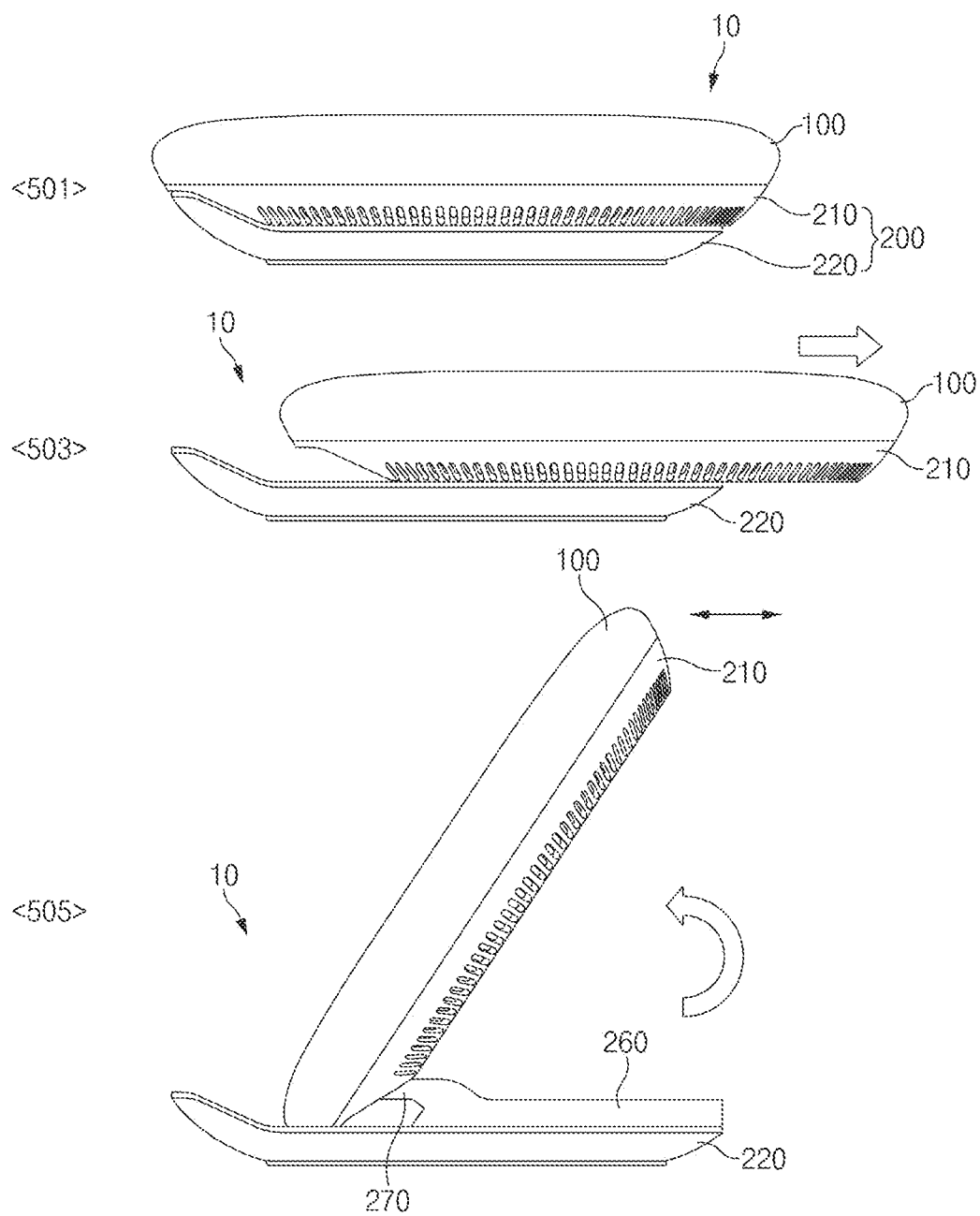
FIG. 5 is a view illustrating an example of changing of a holding state of a wireless charging device according to an embodiment of the present disclosure.

FIG. 5 is a view illustrating an example of changing of a holding state of a wireless charging device according to an embodiment of the present disclosure.

Referring to FIG. 5, as in state 501, the wireless charging device 10 may be disposed such that the upper housing 210, on which the cover part 100 is disposed, is disposed on the lower housing 220 in parallel with respect to a horizontal surface. In this state, the center of the upper housing 210 and the center of the lower housing 220 may be aligned with each other. Alternatively, a side surface of the upper housing 210 may be connected to or continuously disposed on a side surface of the lower housing 220.

If an external pressure is applied (or a physical force is applied in a specific direction), as in state 503, the wireless charging device 10 may be disposed such that the upper housing 210, on which the cover part 100 is disposed, is disposed in parallel to the lower housing 220 with respect to the horizontal surface (or a virtual transverse line in the illustrated drawing) and the center of the upper housing 210 and the center of the lower housing 220 may cross each other with respect to a vertical surface (or a virtual longitudinal line in the illustrated drawing). According to an embodiment, the upper housing 210 positioned on the lower housing 220 may be slid from the lower housing 220 by a specific distance (e.g., 10 mm to 50 mm, for example, 25 mm) by an external pressure applied in a first direction. Then, a specific portion of the upper housing 210 may be laid on the lower housing 220, and the remaining portions of the upper housing 210 may come out from the bottom in which the lower housing 220 is positioned. According to various embodiments, the wireless charging device 10 may return to state 501 as an external force (e.g., a force that is applied by the user in one direction) that pushes the upper housing 210 in a second direction that is opposite to the first direction. According to various embodiments, a configuration of applying the external force may be at least one of the upper housing 210 or the lower housing 220. For example, if an external force is applied to the lower housing 220 in the second direction while the upper housing 210 is fixed or an external force is applied to the lower housing 220 in the second direction while an external force in the first direction is applied to the upper housing 210, the upper housing 210 and the lower housing 220 may cross each other as in state 503. A distance by which the upper housing 210 is slid with respect to the lower housing 220 may vary according to a magnitude and a duration of an external force. Alternatively, a limit range (e.g., a range in which the upper housing 210 and the lower housing 220 vertically overlap each other by at least a specific degree) in which the upper housing 210 is slid on the lower housing 220 may be determined, and a distance by which the upper housing 210 is slid may vary according to an external pressure within the limit range. In this regard, the wireless charging device 10 may include a sliding part 260 of a structure connecting the upper housing 210 and the lower housing 220.

If an external force (or a physical force) is applied in a direction in which the upper housing 210 is raised, as in state 505, the wireless charging device 10 may be disposed such that the upper housing 210 is inclined from the lower housing 220 at a specific angle with respect to a horizontal plane. The angle of the inclination may vary according to a magnitude or a duration of the external force that raises the upper housing 210. According to various embodiments, the upper housing 210 may have an inclination within an acute angle range that does not exceed 90 degrees with respect to the lower housing 220. In this regard, the wireless charging device 10 may include a hinge part 270 of a structure connecting the upper housing 210 and the lower housing 220. One side of the upper housing 210 may contact one side of the upper surface of the lower housing 220 while the upper housing 210 is inclined at a specific angle. Even when the upper housing 210 is inclined at a specific angle with respect to the lower housing 220, the upper housing 210 may be slid on the lower housing 220 by a specific distance if an external force is applied in the first direction or the second direction.

Figure 6:
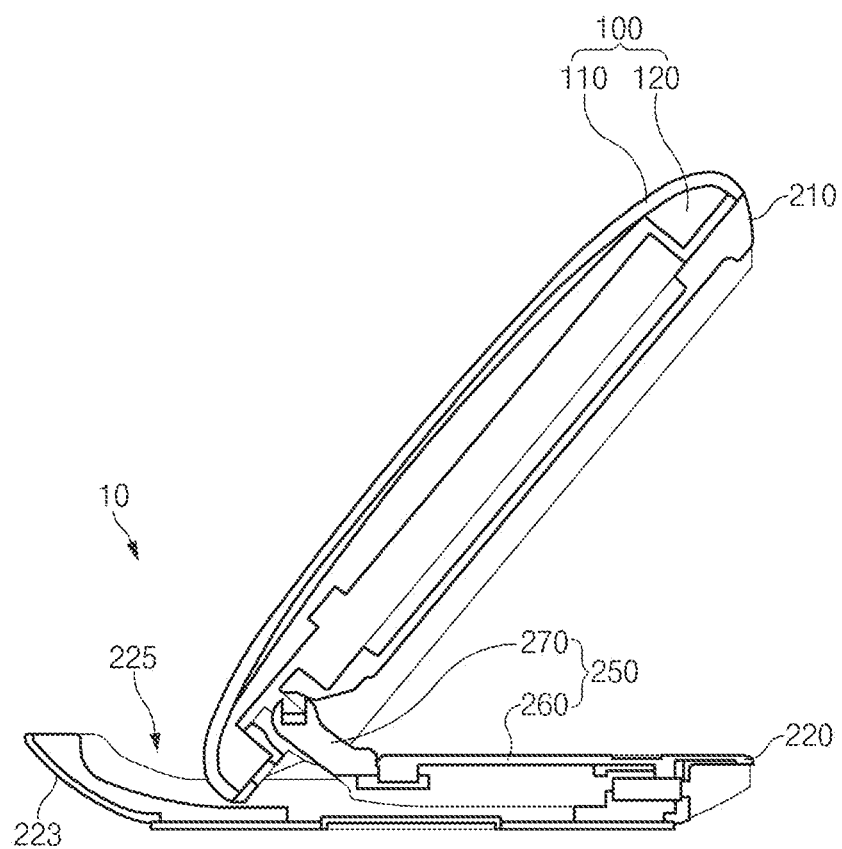
FIG. 6 is a view illustrating an example of a section of a wireless charging device in a specific holding state according to an embodiment of the present disclosure.

FIG. 6 is a view illustrating an example of a section of a wireless charging device in a specific holding state according to an embodiment of the present disclosure.

Referring to FIG. 6, the wireless charging device 10 may include an upper housing 210, to which the cover part 100 is coupled, and a lower housing 220 coupled to the upper housing 210. The upper housing 210 may be held at a specific inclination with respect to the lower housing 220 in correspondence to an operation of an external force (e.g., an external force in the first direction and an upward external force). As mentioned above, the cover part 100 may include a first cover 110 and a second cover 120. The upper housing 210, to which the cover part 100 is coupled, may be fixed while the lower housing 220 is inclined at a specific angle, according to a change of the holding state.

A holding state changing part 250 that couples the upper housing 210 and the lower housing 220 may be disposed on one side of the lower housing 220. The holding state changing part 250 may include a sliding part 260 configured to move the upper housing 210 horizontally (or a transverse direction in the illustrated drawing), and a hinge part 270 configured to rotate the upper housing 210 in a horizontal state at a specific inclination.

The sliding part 260 may be connected to the hinge part 270, and may slide the upper housing 210 connected to the hinge part 270 horizontally in correspondence to an external force. One side of the hinge part 270 may be connected to the sliding part 260, and an opposite side of the hinge part 270 may be coupled to one side of the upper housing 210. As the upper housing 210 is moved upwards while being inclined with respect to the hinge part 270, one side of the upper housing 210 may be seated and fixed inside the lower housing 220 and an opposite side of the upper housing 210 may be inclined upwards at a specific angle.

While the upper housing 210 is rotated about the hinge part 270, the seating part 225 may be exposed to the outside inside the extension part 223 of the housing 220. One side of the portable electronic device may be seated in the seating part 225 corresponding to an inside of the extension part 223 of the lower housing 220. In this regard, the seating part 225 of the lower housing 220 may include a layer of a material (e.g., silicon or rubber) having a relatively high frictional force to restrain the portable electronic device from being pushed or moved. Alternatively, the seating part 225 may be formed of an elastic material (e.g., sponge, rubber, or a resin) that may absorb an impact generated while the portable electronic device is laid. In the wireless charging device 10 having the above-mentioned structure, the upper housing 210 and the lower housing 220 may be disposed in parallel in correspondence to an external force that presses one side of the upper housing 210 toward the lower housing 220. Further, in correspondence to an external pressure applied horizontally, the central axis of the upper housing 210 and the central axis of the lower housing 220 may be aligned with each other with respect to a vertical line at a specific location.

Figure 7:
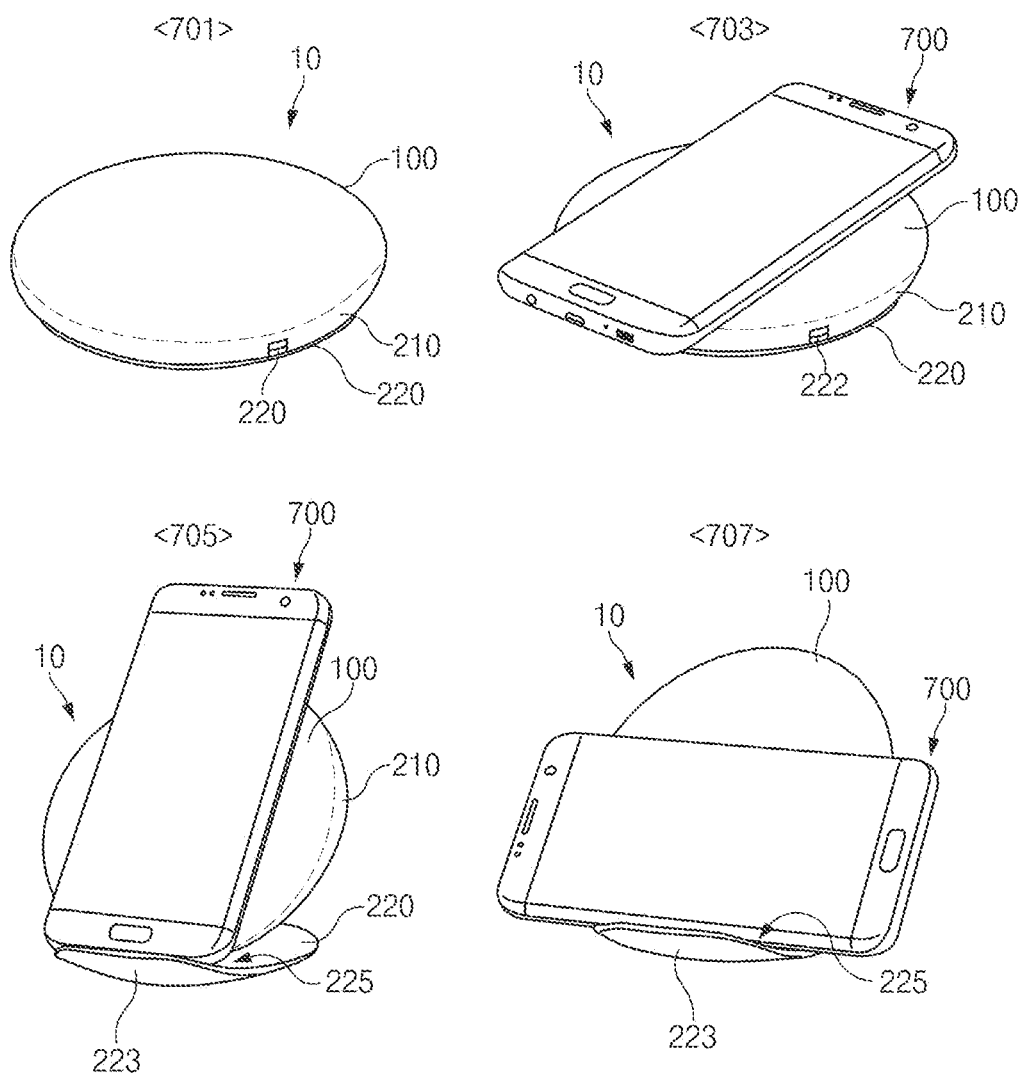
FIG. 7 is a view illustrating an example of various disposition states of a portable electronic device according to an embodiment of the present disclosure.

FIG. 7 is a view illustrating an example of various disposition states of a portable electronic device according to an embodiment of the present disclosure.

Referring to FIG. 7, as in state 701, the wireless charging device 10 may be disposed such that the upper housing 210 including the cover part 100 is disposed in parallel to the lower housing 220. Then, the cover part 100 may have a shape protruding upwards from a front surface of the upper housing 210 by a specific height.

As in state 703, the portable electronic device 700 may be positioned on the cover part 100 of the wireless charging device 10. According to an embodiment, a central portion (or an area in which the charging coil is disposed) of a rear surface of the portable electronic device 700 may be aligned with the center of the cover part 100. If the portable electronic device 70 is positioned on the cover part 100, the power source part 222 of the wireless charging device 10 may detect at least one charging coil currently aligned with the portable electronic device 700 by using the charging coils and may output electric power related to charging of the battery of the portable electronic device by using the at least one detected charging coil. Then, the wireless charging device 10 may charge the portable electronic device 700 by using the charging coils disposed at the peripheral portion of the cover part 100 as well as at the central portion of the cover part 100. Accordingly, even when one periphery of the portable electronic device 700 is inclined while being disposed in the wireless charging device 10 in a horizontally disposed state, the wireless charging device 10 may perform a charging function with a relatively high efficiency by using the charging coil disposed at the corresponding location.

As in state 705, the wireless charging device 10 may be in a stand state in which the upper housing 210 and the lower housing 220 are disposed at a specific inclination. Correspondingly, while one side (e.g., a bottom part of the portable electronic device 700) of the portable electronic device 700 may is seated on the seating part 225 provided inside the extension part 223 of the lower housing 220, the rear surface of the portable electronic device 700 may face the cover part 100. When the charging coil is disposed at a central portion of the portable electronic device 700, the charging coil disposed at a central portion of the upper housing 210 may be aligned with the charging coil of the portable electronic device 700 such that charging power may be supplied wirelessly. When the charging coil is disposed at a lower end of the portable electronic device 700, the third charging coil located close to one periphery of the upper housing 210 may be aligned with the charging coil of the portable electronic device 700 such that charging power may be supplied wirelessly to the portable electronic device 700. According to various embodiments, the wireless charging device 10 may supply electric power by using the first charging coil and the third charging coil in consideration of the wireless charging efficiency of the portable electronic device 700.

As in state 707, the wireless charging device 10 may be in a stand state in which the upper housing 210 and the lower housing 220 are disposed at a specific inclination. The stand state may include the same state as state 705 or a state having an inclination that is different from state 705. A side surface of the portable electronic device 700 may be seated in the seating part 225 inside the extension part 223 provided on one side of the lower housing 220. When the wireless charging coil disposed on a rear surface of the portable wireless charging device 10 is circular and is arranged toward the center of the cover part 100 of the wireless charging device 10, the wireless charging device 10 may charge the portable electronic device 700 by using only the first charging coil aligned with the charging coil of the portable electronic device. When the charging coil disposed inside the rear surface of the portable electronic device 700 is elliptical, unlike state 705, the charging coil of the wireless charging device 10 aligned with the charging coil of the portable electronic device may be different. In this regard, the power source part 222 of the wireless charging device 10 may identify the charging efficiencies of the charging coils and the charging coil of the portable electronic device 700. The power source part 222 of the wireless charging device 10 may detect at least one charging coil of the wireless charging device 10 that indicates a charging efficiency of a specific magnitude or more according to the arrange state of the charging coil of the portable electronic device, and may charge the portable electronic device 700 by using the at least one detected charging coil. According to an embodiment, when a plurality of charging coils are necessary such that the charging efficiency of the portable electronic device 700 may be a specific value or more, the wireless charging device 10 may charge the portable electronic device 700 by supplying electric power to a plurality of charging coils.

Figure 8A:
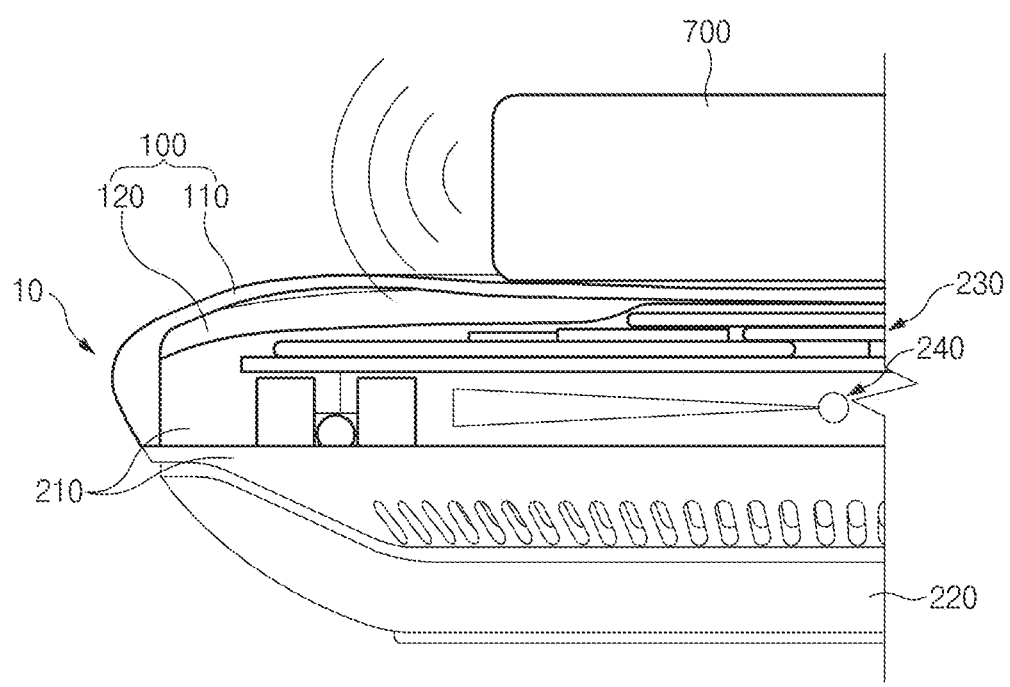
FIG. 8A is a view for an example of maintaining a disposition state due to generation of vibration of a portable electronic device according to an embodiment of the present disclosure.

FIG. 8A is a view for an example of maintaining a disposition state due to generation of vibration of a portable electronic device according to an embodiment of the present disclosure.

Referring to FIG. 8A, the portable electronic device 700 may be positioned on one side of the wireless charging device 10. Then, the wireless charging device 10 may be in a horizontally disposed state in which the upper housing 210 and the lower housing 220 are disposed in parallel with respect to the horizontal surface while the centers of the upper housing 210 and the lower housing 220 coincide with each other. At least a portion of the rear surface of the portable electronic device 700 may face one side of the cover part 100 of the wireless charging device 10. One side of the cover part 100 may be pressed by the weight of the portable electronic device 700 as the portable electronic device 700 is positioned on the wireless charging device 10.

In the cover part 100, because the peripheral portions of the first cover part 100 and the second cover part 100 are thicker than the central portions of the first cover part 100 and the second cover part 100, the cover part at a periphery of the wireless charging device 10 may be disposed to surround a portion of the periphery of the portable electronic device 700 while the portable electronic device 700 is positioned at the central portion of the wireless charging device 10. According to various embodiments, the portable electronic device 700 may include a vibratory element, and may generate vibration through a call connection function. The vibration generated by the portable electronic device 700 may be absorbed by the cover part 100. For example, the vibration generated by the portable electronic device 700 may be secondarily absorbed by the second cover 120 after being primarily absorbed by the first cover 110. Accordingly, even when the portable electronic device 700 is shaken by vibration, the portable electronic device 700 may maintain its initial location without changing its location or deviating from a surface of the cover part 100. If the portable electronic device 700 is positioned on the wireless charging device 10 while the upper housing 210 and the lower housing 220 of the wireless charging device 10 are disposed in parallel, the charging coil 230 (e.g., the first charging coil)

disposed inside the upper housing 210 may be related to charging of the portable electronic device 700.

Figure 8B:
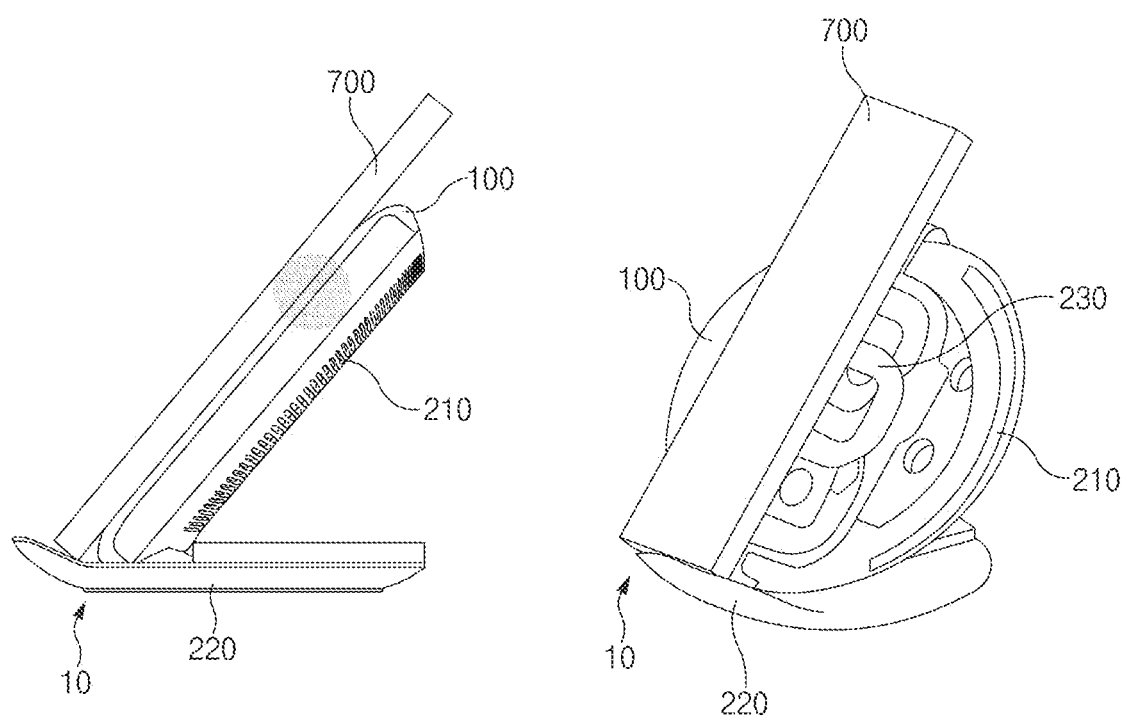
FIG. 8B is a view for an example of various disposition states of a portable electronic device according to an embodiment of the present disclosure.

FIG. 8B is a view for an example of various disposition states of a portable electronic device according to an embodiment of the present disclosure.

Referring to FIG. 8B, in the wireless charging device 10, the upper housing 210 including the cover part 100 may be held while being inclined at a specific angle (e.g., 30 degrees to 90 degree, for example, 50 degrees) from the lower housing 220. Then, one side of the upper housing 210 or the cover part 100 may contact an inside of the lower housing 220, and may be supported by the hinge part. The portable electronic device 700 may be disposed on the cover part 100 inclined at a specific angle to be inclined at a specific angle. According to an embodiment, as illustrated, the portable electronic device 700 having a rectangular shape one edge of which is longer than another edge thereof may be disposed on the cover part 100 while being inclined longitudinally. Then, the cover part 100 having an elasticity may be pressed to the lower side of the cover part 100 or toward the upper housing 210 by the weight of the portable electronic device 700 as the portable electronic device 700 is held on the cover part 100. As the cover part 100 is pressed, the rear surface of the portable electronic device 700 may be disposed closer to the charging coil 230 (e.g., the second charging coil) disposed inside the upper housing 210. Further, an interval between the rear surface of the portable electronic device 700 and the second charging coil may be reduced. Accordingly, the portable electronic device 700 may be charged with an efficiency that is higher than that of the charging coil 230.

Figure 8C:
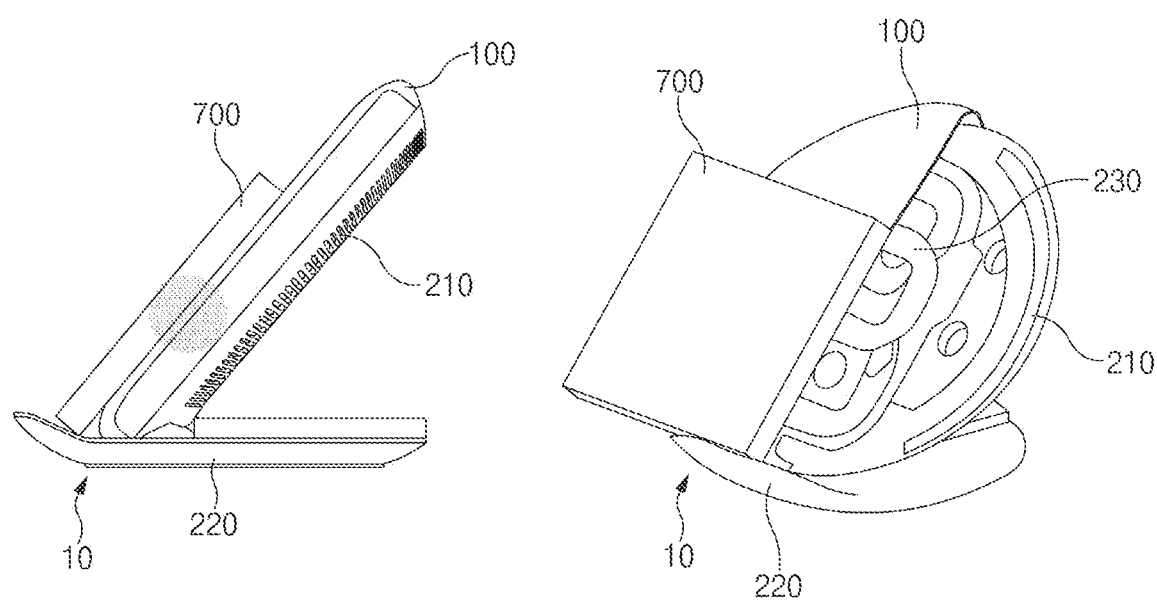
FIG. 8C is a view for an example of various disposition states of a portable electronic device according to an embodiment of the present disclosure.

FIG. 8C is a view for an example of various disposition states of a portable electronic device according to an embodiment of the present disclosure.

Referring to FIG. 8C, in the wireless charging device 10, the upper housing 210 including the cover part 100 may be held while being inclined at a specific angle from the lower housing 220. The portable electronic device 700 may be disposed on the cover part 100 inclined at a specific angle to be inclined at a specific angle. According to an embodiment, as illustrated, the portable electronic device 700 having a rectangular shape one edge of which is longer than another edge thereof may be disposed on the cover part 100 while being inclined transversely. Then, the cover part 100 having an elasticity may be pressed to the lower side of the cover part 100 or toward the upper housing 210 by the weight of the portable electronic device 700 as the portable electronic device 700 is held on the cover part 100. As the cover part 100 is pressed, the rear surface of the portable electronic device 700 laid transversely may be disposed closer to the charging coil 230 (e.g., the third charging coil) disposed inside the upper housing 210. Further, an interval between the rear surface of the portable electronic device 700 and the third charging coil may be reduced. Accordingly, the portable electronic device 700 may be charged with an efficiency that is higher than that of the charging coil 230.

Figure 9:
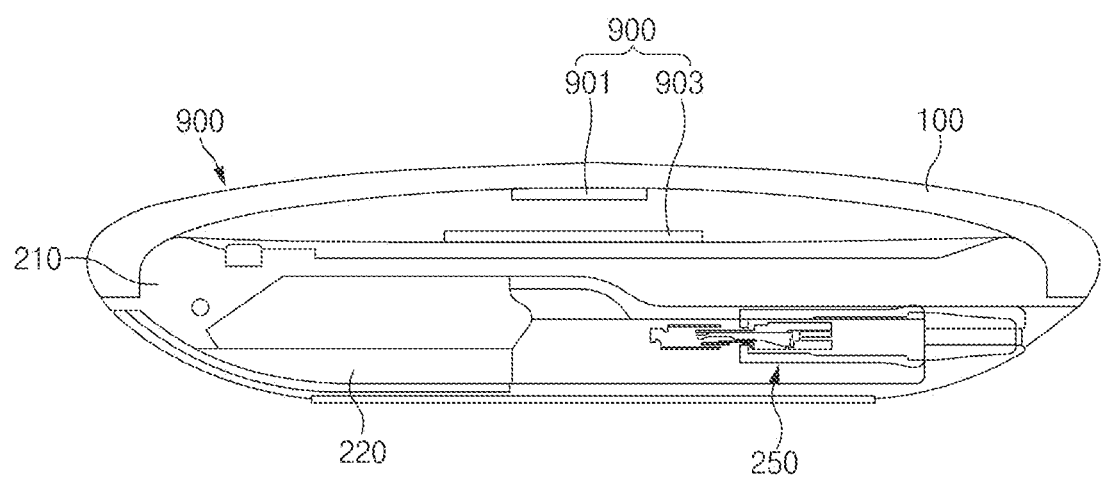
FIG. 9 is a view illustrating another example of a wireless charging device according to an embodiment of the present disclosure.

FIG. 9 is a view illustrating another example of changing of a holding state of a wireless charging device according to an embodiment of the present disclosure.

Referring to FIG. 9, according to an embodiment, the wireless charging device 900 may include a cover part 100, a cover deforming part 910, an upper housing 210, and a lower housing 220, and a power source part 222 may be disposed on one side of the lower housing 220. Additionally, as described above, the wireless charging device 900 may further include at least one charging coil, a cooling fan, and a holding state changing part. As described above, the cover part 100, for example, may include multiple layers including a first cover and a second cover. Alternatively, the cover part 100 may be formed of a material that may absorb an impact generated when or after the portable electronic device is positioned while restraining movement of the portable electronic device.

The cover deforming part 910 may include a metallic member 901 disposed under the cover part 100, and an electromagnet part 903 disposed on one side of the upper housing 210. The metallic member 901, for example, may be disposed at a central lower portion of the cover part 100 while having a specific size and a specific width. The metallic member 901, for example, may contact the electromagnetic member 903 by an attractive force while the electromagnetic member 903 performs a function of a magnet. The electromagnetic member 903 may be arranged under the metallic member 901, and may be fixed to an upper end of the upper housing 210. The electromagnetic member 903 may perform the function of a magnet by using electric power supplied from the power source part 222. While the electromagnetic member 903 performs the function of a magnet, the metallic member 901 may be pulled to the lower side by the attractive force of the electromagnetic member 903. Accordingly, a portion (e.g., a central portion) of the cover part 100, to which the metallic member 901 is coupled, may be recessed to the central lower side. If the electric power supplied to the electromagnetic member 903 is interrupted, the electromagnetic member 903 loses the function of the magnet, and accordingly, the metallic member 901 may move the original location (e.g., a location that is spaced apart from the electromagnetic member 903). Accordingly, the cover part 100, to which the metallic member 901 is coupled, may be restored to its original shape. The original shape of the cover part 100, for example, may include a state in which a central portion of the cover part 100 rises from a peripheral portion of the cover part 100. According to various embodiments, the metallic member 901 may be replaced by an electromagnetic member, and correspondingly, the electromagnetic member 903 may be replaced by a metallic member.

The wireless charging device 900 having the above-described structure may absorb an impact generated by the portable electronic device 700 more efficiently as the portable electronic device 700 is positioned on the cover part 100 while a specific space is maintained between the cover part 100 and the upper housing 210. Further, as the center of the cover part 100 is recessed while the metallic member 901 and the electromagnetic member 903 are coupled to each other by an attractive force, the rear surface of the portable electronic device 700 may be located closer to the upper housing 210. In this case, the wireless charging device 900 may increase charging efficiency while an interval between the charging coil disposed under the upper housing 210 and the portable electronic device is minimized.

Figure 10A:
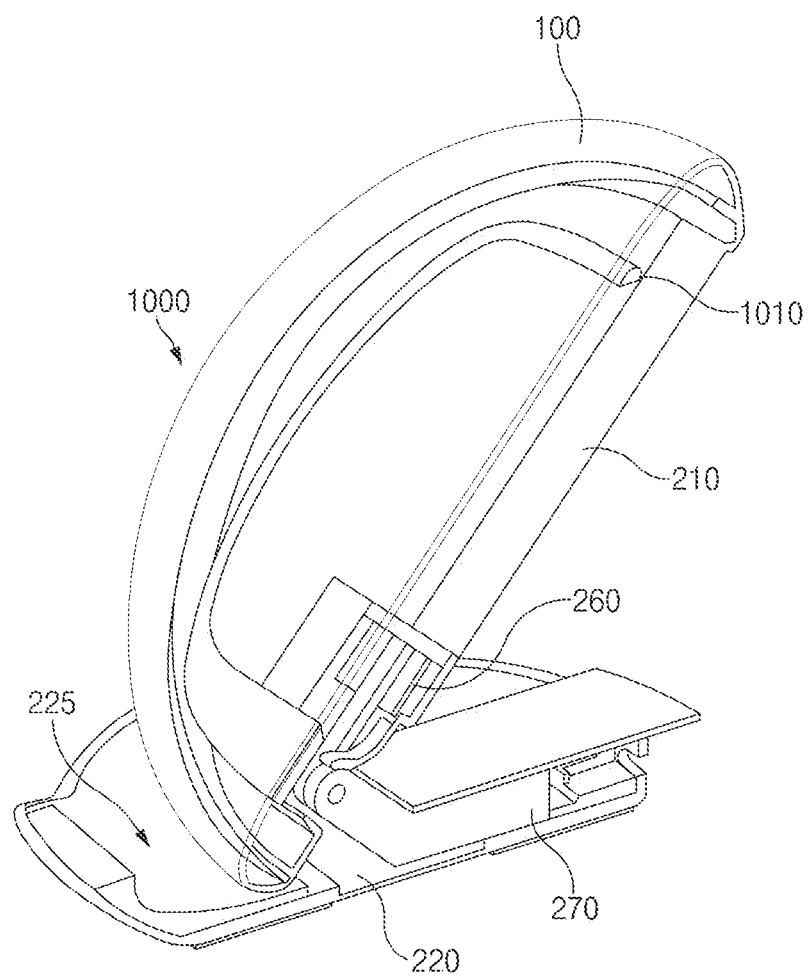
FIG. 10A is a view illustrating a perspective view of a wireless charging device according to various embodiments and a portion of a cutaway surface of the perspective view.
Figure 10B:
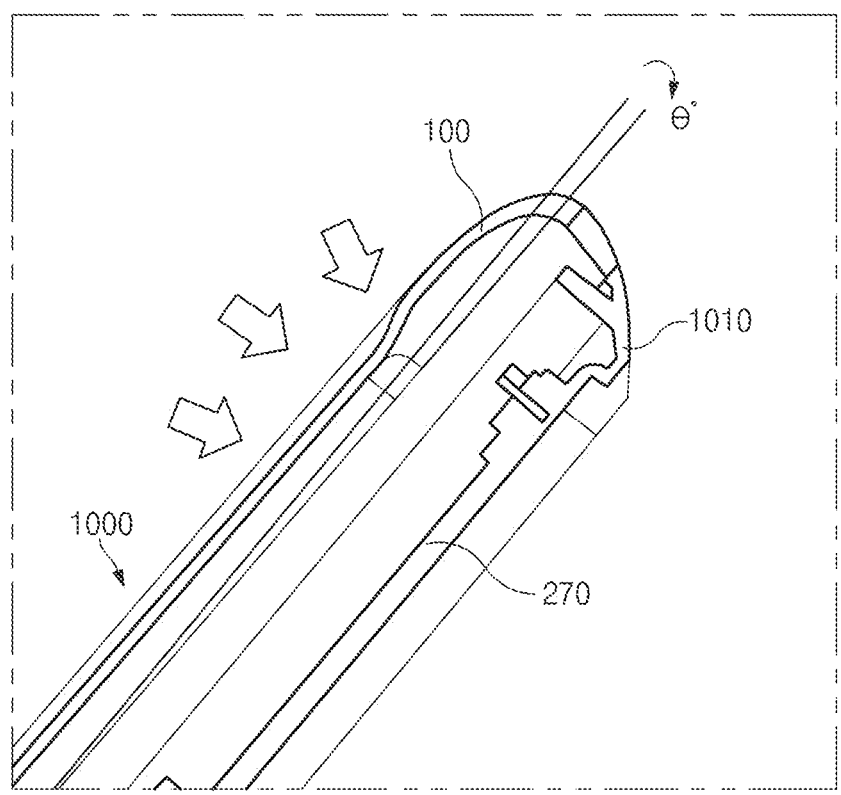
FIG. 10B is a view illustrating an example of a structure of a hinge part of a wireless charging device according to various embodiments.
Figure 10C:
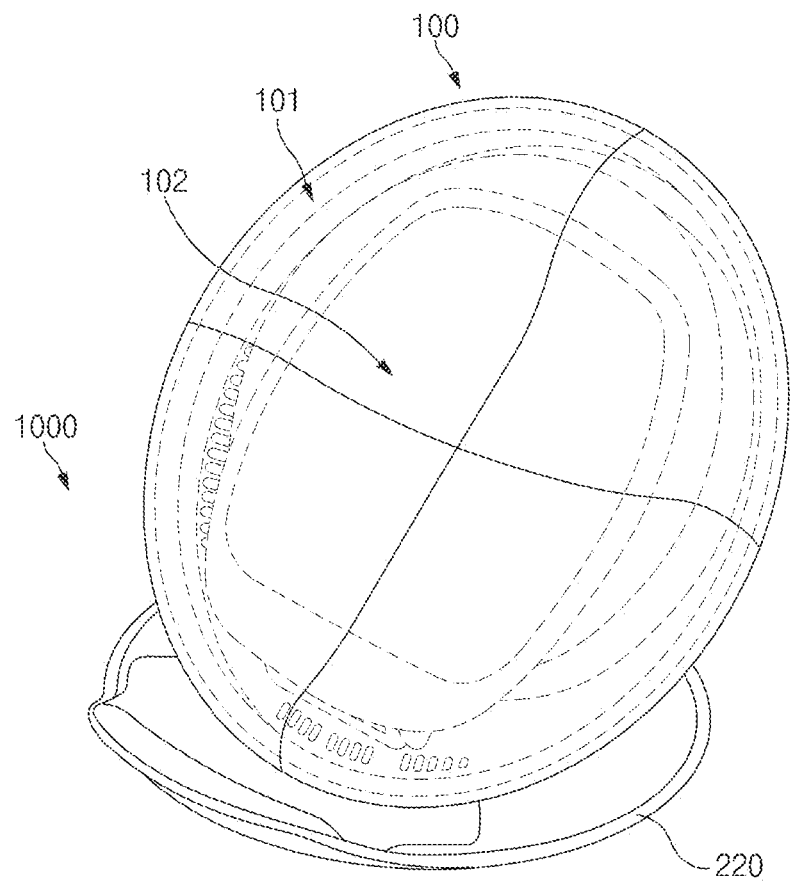
FIG. 10C is a view illustrating a perspective view of a wireless charging device according to various embodiments.

FIG. 10A is a view illustrating a perspective view of a wireless charging device according to various embodiments and a portion of a cutaway surface of the perspective view. FIG. 10B is a view illustrating an example of a structure of a hinge part of a wireless charging device according to various embodiments. FIG. 10C is a view illustrating a perspective view of a wireless charging device according to various embodiments.

Referring to FIGS. 10A and 10B, the wireless charging device 10 according to an embodiment of the present disclosure may change the shape of the cover part 100 in correspondence to a change of the holding state. In this regard, the wireless charging device 1000 may include a cover adjusting part 1010 connected to the hinge part 270. Further, the wireless charging device 1000 may include a lower housing 220, an upper housing 210, and a cover part 10 disposed on the upper housing 210. As described above, the cover part 100 may include a first cover and a second cover. Further, at least a portion of the cover part 100 may be formed of a material, such as sponge or urethane, which may absorb an impact, and the remaining portions of the cover part 100 may be formed of a material, such as rubber and leather, which has a relatively high frictional force.

In the above-described wireless charging device 1000, the outer shape of the cover part 100 may be changed by pulling the cover part 100 to the lower side of the upper housing 210 by the cover adjusting part 1010 connected to the hinge part 270. According to an embodiment, at least a portion of the cover adjusting part 1010 may be fixed to the cover part 100, one side of the cover adjusting part 1010 may be coupled to the hinge part 270, and the cover part 100 is pulled to the lower side of the upper housing 210 while the hinge part 270 is rotated. According to an embodiment, while the hinge part 270 is inclined at an angle that is smaller than the inclination angle (e.g., 50 degrees) of the hinge part 270 (e.g., designed to be inclined by 1 degree or more) and the hinge part 270 has a specific angle (e.g., 50 degrees) through a rotation operation of the upper housing 210, the cover adjusting part 1010 is also inclined at a specific angle (e.g., 49 degrees) but is inclined at an angle that is smaller than the angle of the hinge part so that the connected cover part 100 may also pull the upper housing 210 downwards. Accordingly, while the upper housing 210 of the wireless charging device 1000 is raised upwards, the cover adjusting part 1010 may pull the cover part 100 in a direction that is opposite to the direction in which the upper housing 210 is raised.

Accordingly, as illustrated in FIG. 10C, a spacing distance between the rear surface of the portable electronic device and the upper housing 210 may be minimized while the portable electronic device is held on the cover part 100 as the cover part 100 is changed into a state in which the central portion 102 of the cover part 100 is recessed inwards with respect to the peripheral part 101. As a result, the wireless charging device 1000 may provide a higher charging efficiency while an interval between the portable electronic device and the charging coil disposed under the upper housing 210 is minimized.

Figure 11:
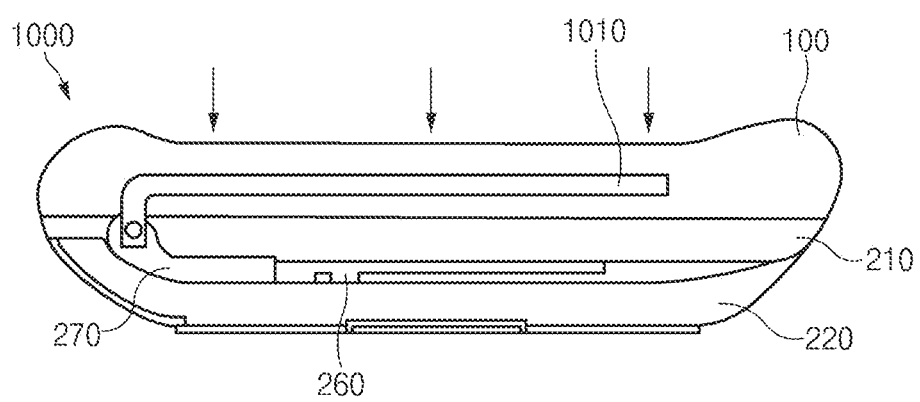
FIG. 11 is a view illustrating another example of a wireless charging device according to various embodiments.

FIG. 11 is a view illustrating another example of a wireless charging device according to various embodiments.

Referring to FIG. 11, the upper housing 210 and the lower housing 220 of the wireless charging device 1000 may be positioned in parallel to each other or horizontally. In this operation, the cover adjusting part 1110 connected to the hinge part 270 may deform the cover part 100 such that at least one side of the cover part 100 is recessed while being pulsed downwards (e.g., to the lower side of the upper housing 210). In this regard, while the upper housing 210 and the lower housing 220 is disposed in parallel, the cover adjusting part 1110 connected to one side of the hinge part 270 may be pulled downwards. As in the above-described state, in the wireless charging device 1000, while the portable electric device 700 is disposed on the cover part 100 while the central portion of the cover part 100 is recessed, the portable electronic device 700 may be prevented from being shaken or separated and charging efficiency may be improved by supporting a side surface of the portable electronic device 700 more firmly.

In accordance with an aspect of the present disclosure, there is provided a wireless charging device including a first cover, at least a portion of a surface of which has a frictional force of a specific magnitude, a second cover disposed under the first cover and having an elastic force of a specific magnitude, an upper housing disposed under the second cover, a lower housing coupled to the upper housing, at least one charging coil disposed between the upper housing and the lower housing and configured to supply electric power to an electronic device positioned on an upper surface of the first cover, a power source part connected to the at least one charging coil, and a holding state changing part configured to help change holding states of the upper housing and the lower housing.

According to various embodiments, the holding state changing part may include a sliding part configured to move the upper housing horizontally with respect to the lower housing, and a hinge part configured to rotate the upper housing upwards with respect to the lower housing.

According to various embodiments, the lower housing may include a seating part exposed while the upper housing is held at a specific angle and in which at least one side of the electronic device is seated close to a front surface of the upper housing.

According to various embodiments, the seating part may include a layer, at least a portion of which is formed of a material having a frictional force of a specific magnitude or more.

According to various embodiments, the wireless charging device may further include a cover adjusting part, at least one side of which is fixed to the first cover or the second cover, an opposite side of which is connected to the hinge part, and which is configured to pull the first cover or the second cover to a lower side of the upper housing according to the holding state of the upper housing.

According to various embodiments, the first cover may be formed of rubber.

According to various embodiments, the second cover may be formed of sponge or a resin.

According to various embodiments, the wireless charging device may further include at least one of a bonding layer disposed between the first cover and the second cover, or a bonding layer disposed between the second cover and the upper housing.

According to various embodiments, the at least one charging coil may include a first charging coil disposed under the center of the upper housing, a second charging coil disposed under the first charging coil and disposed such that the center of the second charging coil is spaced apart from the center of the first charging coil in a first direction, and a third charging coil disposed under the first charging coil or the second charging coil and disposed such that the center of the third charging coil is spaced apart from the center of the first charging coil in a second direction.

According to various embodiments, the second charging coil and the third charging coil may be disposed to be symmetrical to each other leftwards and rightwards with respect to the center of the first charging coil.

According to various embodiments, the upper housing may include a central portion including a protrusion disposed to cover the first charging coil, and a peripheral portion that is lower than the protrusion with respect to one side of the central portion of the upper housing and configured to cover the second charging coil and the third charging coil.

According to various embodiments, the thickness of the second cover of an area in which the protrusion is disposed may be smaller than the thickness of the second cover disposed on the peripheral portion.

According to various embodiments, the thickness of the first cover of an area in which the protrusion is disposed may be smaller than the thickness of the first cover disposed on the peripheral portion.

According to various embodiments, the power source part may include a charging control circuit configured to select at least one of the plurality of charging coils, which is able to supply electric power of a specific efficiency and supply electric power.

According to various embodiments, the wireless charging device may further including at least one of a cooling fan disposed under the charging coil, and a temperature sensor configured to sense a temperature related to the charging coil.

According to various embodiments, the power source part may include a temperature control circuit configured to perform a control to activate the cooling fan when the temperature of the charging coil provided by the temperature sensor is a specific temperature or higher According to various embodiments, the upper housing may further include at least one air circulation hole related to circulation of air through rotation of the cooling fan.

According to various embodiments, the wireless charging device may further include a metallic member disposed under the first cover or the second cover, and an electromagnetic member disposed on the upper housing and arranged in the metallic member According to various embodiments, the power source part may be configured to supply electric power to the electromagnetic member when a signal related charging of the electronic device is received.

According to various embodiments, the wireless charging device may further include a bonding layer disposed between the second cover and the upper housing.

The term "module" used in this disclosure may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in computer-readable storage media in the form of a program module. The instruction, when executed by a processor, may cause the one or more processors to perform a function corresponding to the instruction. The computer-readable storage media, for example, may be the memory.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above hardware unit may be configured to operate via one or more software modules for performing an operation of various embodiments of the present disclosure, and vice versa.

A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A wireless charging device comprising:
 a first cover, at least a portion of a surface of which has a frictional force of a specific magnitude;
 a second cover disposed under the first cover and having an elastic force of a specific magnitude;
 an upper housing disposed under the second cover;
 a lower housing coupled to the upper housing;
 at least one charging coil disposed between the upper housing and the lower housing and configured to supply electric power to an electronic device positioned on an upper surface of the first cover;
 a power source part connected to the at least one charging coil; and
 a holding state changing part configured to help change holding states of the upper housing and the lower housing,
 wherein the holding state changing part includes a sliding part configured to move the upper housing horizontally with respect to the lower housing and a hinge part configured to rotate the upper housing upwards with respect to the lower housing,
 wherein the sliding part is connected to the hinge part.

2. The wireless charging device of claim 1, wherein the lower housing includes:
 a seating part exposed while the upper housing is held at a specific angle and in which at least one side of the electronic device is seated close to a front surface of the upper housing.

3. The wireless charging device of claim 2, wherein the seating part includes:
 a layer, at least a portion of which is formed of a material having a frictional force of a specific magnitude or more.

4. The wireless charging device of claim 1, further comprising:
 a cover adjusting part, at least one side of which is fixed to the first cover or the second cover, an opposite side of which is connected to the hinge part, and which is configured to pull the first cover or the second cover to a lower side of the upper housing according to the holding state of the upper housing.

5. The wireless charging device of claim 1, wherein the first cover is formed of rubber, and the second cover is formed of sponge or a resin.

6. The wireless charging device of claim 1, further comprising at least one of:

a bonding layer disposed between the first cover and the second cover; or a bonding layer disposed between the second cover and the upper housing.

7. The wireless charging device of claim 1, wherein the at least one charging coil includes:

a first charging coil disposed under a center of the upper housing;

a second charging coil disposed under the first charging coil and disposed such that a center of the second charging coil is spaced apart from a center of the first charging coil in a first direction; and a third charging coil disposed under the first charging coil or the second charging coil and disposed such that a center of the third charging coil is spaced apart from the center of the first charging coil in a second direction.

8. The wireless charging device of claim 7, wherein the second charging coil and the third charging coil are disposed to be symmetrical to each other leftwards and rightwards with respect to the center of the first charging coil.

9. The wireless charging device of claim 7, wherein the upper housing includes:

a central portion including a protrusion disposed to cover the first charging coil; and a peripheral portion that is lower than the protrusion with respect to one side of the central portion of the upper housing and configured to cover the second charging coil and the third charging coil.

10. The wireless charging device of claim 9, wherein a thickness of the second cover of an area in which the protrusion is disposed is smaller than a thickness of the second cover disposed on the peripheral portion, or a thickness of the first cover of an area in which the protrusion is disposed is smaller than a thickness of the first cover disposed on the peripheral portion.

11. The wireless charging device of claim 7, wherein the power source part includes:

a charging control circuit configured to select at least one of the at least one charging coil, which is able to supply electric power of a specific efficiency and supply electric power.

12. The wireless charging device of claim 1, further comprising at least one of:

a cooling fan disposed under the at least one charging coil; and a temperature sensor configured to sense a temperature related to the at least one charging coil.

13. The wireless charging device of claim 12, wherein the power source part includes:

a temperature control circuit configured to perform a control to activate the cooling fan when the temperature of the at least one charging coil provided by the temperature sensor is a specific temperature or higher, and wherein the upper housing further includes:

at least one air circulation hole related to circulation of air through rotation of the cooling fan.

14. The wireless charging device of claim 1, further comprising:

a metallic member disposed under the first cover or the second cover; and an electromagnetic member disposed on the upper housing and arranged in the metallic member, wherein the power source part is configured to supply electric power to the electromagnetic member when a signal related charging of the electronic device is received.

* * * * *